US006448530B1

(12) United States Patent
Fujita et al.

(10) Patent No.: US 6,448,530 B1
(45) Date of Patent: Sep. 10, 2002

(54) METAL MOLD FOR MOLDING A HONEYCOMB STRUCTURE AND METHOD OF PRODUCING THE SAME

(75) Inventors: Masayoshi Fujita, Toukai; Yosiyasu Andou, Nagoya; Toru Takeno, Okazaki, all of (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 09/303,681

(22) Filed: May 3, 1999

(30) Foreign Application Priority Data

May 11, 1998 (JP) ........................................ 10-127911
May 11, 1998 (JP) ........................................ 10-127912
Jul. 14, 1998 (JP) ........................................ 10-198852

(51) Int. Cl.[7] .............................. B23H 1/00; B23H 9/00
(52) U.S. Cl. .................................................. 219/69.17
(58) Field of Search ............................ 219/69.17, 69.2, 219/69.15; 425/464; 204/224 M

(56) References Cited

U.S. PATENT DOCUMENTS

| | | | | | |
|---|---|---|---|---|---|
| 3,663,787 | A | * | 5/1972 | Haswell, III et al. | 219/69.2 |
| 4,046,984 | A | * | 9/1977 | Vial | 219/69.15 |
| 4,403,131 | A | * | 9/1983 | Cunningham et al. | 219/69.17 |
| 5,008,509 | A | * | 4/1991 | Hattori et al. | 219/69.17 |
| 5,066,215 | A | * | 11/1991 | Peters et al. | |
| 5,238,386 | A | * | 8/1993 | Cunningham et al. | |
| 5,487,863 | A | * | 1/1996 | Cunningham et al. | |
| 5,507,925 | A | * | 4/1996 | Brew | 204/224 M |
| 6,290,837 | B1 | * | 9/2001 | Iwata et al. | 219/69.17 |

* cited by examiner

*Primary Examiner*—Geoffrey S. Evans
(74) *Attorney, Agent, or Firm*—Nixon & Vanderhye PC

(57) ABSTRACT

A method of producing a metal mold for molding a honeycomb structure, wherein the slit grooves are formed by electric discharge machining that is executed a plural number of times by using a small electrode for electric discharge machining having a working surface of an area smaller than the area of the groove-forming surface.

8 Claims, 19 Drawing Sheets

(a)

(b)

(a)

(b)

(c)

(a)

(b)

METAL MOLD FOR MOLDING A HONEYCOMB STRUCTURE AND METHOD OF PRODUCING THE SAME

BACKGROUND OF THE INVENTION

1. Field of the Invention

The present invention relates to a metal mold for molding a honeycomb structure that is used as a catalyst carrier or the like in, for example, a device for cleaning the exhaust gas from an automobile, and to a method of producing the metal mold.

2. Description of the Related Art

A ceramic honeycomb structure comprising, for example, cordierite as a chief component is produced by extrusion-molding a material by using a metal mold. The honeycomb structure constitutes a number of cells by forming the partitioning walls in the form of a lattice, and the cells assume, for example, a hexagonal shape.

To produce a honeycomb structure having cells of the hexagonal shape (hereinafter referred to as hexagonal honeycomb), a metal mold having slit grooves of the shape of a hexagonal lattice must be used and the partitioning walls must be formed in the shape of a hexagonal lattice.

A conventional metal mold for producing a hexagonal honeycomb structure has, as shown in FIGS. 1A and 1B, feed holes 11 for feeding a material and slit grooves 3 formed in the shape of a hexagonal lattice and communicated with the feed holes 11.

To produce this metal mold 1, the feed holes 11 are formed by drilling from one surface of the metal mold blank, and the slit grooves are formed in the shape of a hexagonal lattice from the other surface thereof by such machining means as electric discharge machining. Then, as shown in FIG. 1, the intersecting points of the slit grooves of the shape of a hexagonal lattice are communicated with the feed holes 11 to thereby obtain the metal mold 1.

However, the conventional metal mold 1 for producing the hexagonal honeycomb structure has problems as described below.

That is, in order to uniformly form the partitioning walls of the hexagonal honeycomb structure by using the above-mentioned conventional metal mold 1, the depth of the slit grooves of the shape of a hexagonal lattice must be selected to be not smaller than 10 times as great as the width of the grooves. Therefore, an extended period of time is required for forming the slit grooves.

Furthermore, when it is attempted to form the slit grooves relying upon, for example, the electric discharge machining, the electrodes are worn out during the machining often causing a dispersion in the depth of the slit grooves. In this case, therefore, the partitioning walls of the obtained hexagonal honeycomb structure loses uniformity.

To produce the metal mold 1, furthermore, a metal mold blank 4 is prepared having a hole-forming surface 41 in which the feed holes 11 will be formed and having a groove-forming surface 43 in which the slit grooves 3 will be formed (see FIG. 14). The feed holes 11 are formed by drilling in the hole-forming surface, the slit grooves 3 of the shape of a hexagonal lattice are formed by the electric discharge machining in the groove-forming surface, and the slit grooves 3 and the feed holes 11 are communicated with each other thereby to obtain the metal mold 1.

Referring to FIG. 2, the electric discharge machining is carried out by using an electrode 81 for the electric discharge machining provided with a working surface 80 of the shape of a lattice corresponding to the whole surfaces of the slit grooves 3 that are to be formed, and repeating the electric discharge between the electrode 81 for the electric discharge machining and the groove-forming surface 43 of the metal mold blank 4 in a working solution. The working solution is fed from a working solution-feeding pipe 95 of a working solution-feeding jig 9 disposed on the back surface side of the electrode 81 for the electric discharge machining.

However, the above-mentioned conventional method of producing the metal mold for forming a honeycomb structure has problems as described below.

That is, the slit grooves 3 have heretofore been formed by the electric discharge machining by using an electrode for the electric discharge machining having the shape of a lattice corresponding to the whole slit grooves that are to be formed. During the electric discharge machining, the electrode for the electric discharge machining is often distorted or worn out in varying amounts and is deformed. In such a case, the depth of the slit grooves varies causing a problem from the standpoint of quality.

On the other hand, the electrode for the electric discharge machining is made of a very hard material such as a tungsten alloy or the like, and is produced requiring a long period of time of, for example, several tens of days. When it is attempted to newly produce a metal mold for molding a honeycomb structure, therefore, several tens of days are, first, required for producing the electrode for the electric discharge machining and, then, another several tens of days are required for forming the slit grooves by the electric discharge machining, which is a very long lead time.

SUMMARY OF THE INVENTION

The present invention was accomplished in view of the above-mentioned problems inherent in the prior art, and its object is to provide a metal mold for molding a honeycomb structure, capable of precisely and efficiently forming the slit grooves within a short lead time and exhibiting good moldability, and a method of producing the same.

A first invention is concerned with a metal mold for molding a hexagonal honeycomb structure, having feed holes for feeding a material, pool grooves formed in the shape of a triangular lattice and communicated with the feed holes, and slit grooves formed in the shape of a hexagonal lattice and communicated with the pool grooves.

In this invention, the most important point is that the pool grooves of the shape of a triangular lattice are formed between the feed holes and the slit grooves.

The pool grooves are formed in the shape of a triangular lattice by, for example, regularly and alternatingly arranging equilateral triangles in the opposing directions.

It is further desired that the pool grooves and the feed holes are communicated with each other at the intersecting points of the triangular lattices of the pool grooves. This permits the material to smoothly flow from the feed holes to the pool grooves. In this case, the feed holes need not necessarily be communicated at every intersecting point of the pool grooves, but many be constituted in various ways by taking into consideration the size of the honeycomb structure that is to be molded and the moldability. For example, the feed holes may be communicated with every second intersecting point or with every third intersecting point.

It is desired that each hexagonal lattice of the slit grooves is so formed as to come into agreement with a hexagon shaped by combining six triangular lattices of the pool grooves.

In this case, it is possible to more uniformly and smoothly move the material during the extrusion molding.

Here, the hexagon shaped by combining six triangular lattices of the pool groups stands for the one formed as an outer shape of when six triangles are viewed as a unit, the six triangles being radially arranged neighboring each other about an intersecting point of the pool grooves.

In this case, therefore, when the slit grooves and the pool grooves are viewed from the front, the pool grooves are located at portions overlapped on the hexagonal slit grooves and on the boundary portions of the six triangles formed by connecting the vertexes thereof and the centers thereof.

A second invention is concerned with a method of producing a metal mold for molding a hexagonal honeycomb structure, having feed holes for feeding a material, pool grooves formed in the shape of a triangular lattice and communicated with the feed holes, and slit grooves formed in the shape of a hexagonal lattice and communicated with the pool grooves, each hexagonal lattice of the slit grooves being so formed as to come into agreement with a hexagon shaped by combining six triangular lattices of the pool grooves;

wherein a metal mold base for forming the feed holes, and a groove-forming member (metal mold blank) having a pool groove-forming surface and a slit groove-forming surface, are prepared;

said feed holes are formed in said metal mold base so as to penetrate therethrough, and a plurality of pool grooves intersecting at an angle of about 60 degrees relative to each other are formed in the shape of a triangular lattice in said pool groove-forming surface of said groove-forming member;

said pool groove-forming surface of said groove-forming member is joined to said metal mold base; and said slit grooves of the shape of a hexagonal lattice are formed in said slit groove-forming surface of said groove-forming member so as to be communicated with said pool grooves.

In this invention, the most important point is that the pool grooves are formed in the shape of a triangular lattice in the pool groove-forming surface of the groove-forming member (metal mold blank), the pool groove-forming surface of the groove-forming member is joined to the metal mold base provided with the feed holes and, then, the slit grooves of the shape of a hexagonal lattice are formed in the slit groove-forming surface of the groove-forming member.

The feed holes are formed it the metal mold base by various machining methods such as drilling, electric discharge machining or the like.

Furthermore, the pool grooves are formed in the groove-forming member relying upon such a method that the operations for forming a plurality of straight grooves in parallel are executed from the three directions to intersect at an angle of about 60 degrees. In this case, the straight pool grooves can be efficiently formed by cutting or grinding by using a rotary tool that features a high working speed.

The slit grooves are formed in the groove-forming member after the groove-forming member and the metal mold base have been joined together. The junction in this case is accomplished by a variety of methods such as diffusion bonding, welding, adhesion with an adhesive, etc.

Since the slit grooves are formed after the junction, it is allowed to prevent the groove-forming member from being split at the time when the slit grooves and the pool grooves are communicated with each other.

The slit grooves can be formed by any machining method such as electric discharge machining, cutting or laser beam machining. Since the depth of the slit grooves can be smaller than that of the prior art, various machining methods can be employed without being affected by the wear of the tools.

Here, the electric discharge machining is a machining method which is based on the electric discharge between an electrode and a workpiece as is well known. The cutting can be accomplished by using a rod-like cutting tool having a cutting side surface and by moving the cutting tool while rotating it. The laser beam machining is a machining method which is carried out by irradiating the working surface with a laser beam.

A third invention is concerned with a method of producing a metal mold for molding a hexagonal honeycomb structure, having feed holes for feeding a material, pool grooves formed in the shape of a triangular lattice and communicated with the feed holes, and slit grooves formed in the shape of a hexagonal lattice and communicated with the pool grooves, each hexagonal lattice of the slit grooves being so formed as to come into agreement with a hexagon shaped by combining six triangular lattices of the pool grooves;

wherein a metal mold blank having a feed hole-forming surface and a slit groove-forming surface is prepared;

feed holes of a predetermined depth are formed in said feed hole-forming surface of said metal mold blank; and a plurality of pool grooves intersecting at an angle of about 60 degrees relative to each other are formed in the shape of a triangular lattice in said pool groove-forming surface of said metal mold blank, and the pool grooves, except those of the hexagonal lattice portion where said slit grooves are to be arranged, are closed thereby to form said slit grooves.

In this invention, the most important point is that the pool grooves and the slit grooves are formed in a manner that the pool grooves of the shape of a triangular lattice are formed first and, then, some of the pool grooves are closed to form the slit grooves. Here, the closure may be effected by stuffing the interior of the pool grooves with a closing agent or by covering the opening portions of the pool grooves.

The feed holes can be formed in the metal mold blank by various machining methods such as drilling, electric discharge machining, etc. The depth of the feed holes is so selected as can be communicated with the pool grooves. Here, the feed holes may be formed before or after the pool grooves or the slit grooves are formed.

The pool grooves can be formed in the slit groove-forming surface relying upon such a method that the operations for forming a plurality of straight grooves in parallel are executed from the three directions to intersect at an angle of about 60 degrees. Here, the depth of the pool grooves is the sum of the depth of the slit grooves that are to be formed and the depth of the pool grooves.

In order to form the slit grooves, the pool grooves are closed by various methods as will be described later. The closure in this case is accomplished to exhibit a strength large enough to withstand the pushing pressure at the time when the extrusion molding is practically conducted by using the metal mold for molding a hexagonal honeycomb structure.

It is desired that the pool grooves of the shape of a triangular lattice according to the third invention are formed by cutting or grinding. This makes it possible to very efficiently form the pool grooves. The working tool in this case will be a rotary tool such as a circular thin-bladed grind stone.

The pool grooves can be closed by laser beam welding. In this case, the positions of the closing portions can be easily determined by controlling the irradiation pattern of the laser beam, to execute the closing processing maintaining a high precision. The laser beam welding can be conducted by either a method by which the opening portions are closed by melt-adhering both walls of the pool grooves that are to be closed or a method by which the opening portions are closed by welding another member such as a welding rod.

Furthermore, the pool grooves are closed by, first, stuffing the whole pool grooves of the shape of a triangular lattice with a closing agent, permitting the closing agent to be selectively coagulated in the pool grooves except those of the hexagonal lattice portion where said slit grooves are to be arranged, and removing the uncoagulated closing agent from the slit groove portions. In this case, the closing depth of the closing portions is adjusted depending upon the amount of the closing agent. Therefore, the depth of the pool grooves can be easily adjusted.

A metal powder or a thermosetting resin is used as the closing agent, and the closing agent is selectively coagulated upon solidifying or sintering by being irradiated with a laser beam. In this case, too, the positions of the closing portions can be easily determined by controlling the irradiation pattern of the laser beam, to execute the closing processing maintaining a high precision.

Furthermore, a photocuring resin can be used as the closing agent, and the closing agent is selectively coagulated by the irradiation with light in a state where the slit groove-forming portion is masked. In this case, heat is not generated in large amounts during the closing processing, and the metal mold is reliably prevented from being affected by heat.

Moreover, the pool grooves are closed by, first, stuffing the whole pool grooves of the shape of a triangular lattice with a false closing agent, permitting the false closing agent to be selectively coagulated in the pool grooves in the hexagonal lattice portion where said slit grooves are to be arranged, removing the uncoagulated false closing agent from the slit groove portions, closing the pool grooves from which said false closing agent is removed with a closing agent, and removing the false closing agent from said slit groove-forming portion.

It is desired that the closing agent is a plated layer. This makes it possible to easily accomplish the closing processing. In this case, it is desired to use the false closing agent which exhibits the effect for preventing the formation of the plated layer. After the plating, therefore, the false closing agent can be easily removed.

A fourth invention is concerned with a method of producing a metal mold for molding a honeycomb structure, having a plurality of feed holes for feeding a material and slit grooves formed in the shape of a lattice being communicated with said feed holes to mold the material into a honeycomb shape, wherein the slit grooves are formed in the groove-forming surface of the metal mold blank by the electric discharge machining that is executed a plural number of times by using an electrode for the electric discharge machining having a working surface of an area smaller than the area of said groove-forming surface.

In this invention, the most important point is that the slit grooves are formed by the electric discharge machining that is executed a plural number of times by using an electrode for the electric discharge machining having a working surface of an area smaller than the area of the groove-forming surface of the metal mold blank.

As described above, the electrode for the electric discharge machining has a working surface of an area smaller than that of the groove-forming surface, and is smaller than the conventional electrode for the electric discharge machining.

The electric discharge machining may be executed a plural number of times repetitively by using the above-mentioned small electrode for the electric discharge machining or by using another small electrode for the electric discharge machining after each time or after a plurality of times.

According to the fourth invention, it is desired that the working surface of the electrode for the electric discharge machining is of a size capable of machining one region among n regions of said groove-forming surface that is divided into n regions in the direction of width, and the electric discharge machining is executed by repeating, a plural number of times, a unit work which works said n regions to accomplish a predetermined depth by using one or a plurality of electrodes for the electric discharge machining.

That is, the regions are not worked to a predetermined depth through one time of the electric discharge machining but, instead, the whole groove-forming surface is worked to a predetermined depth through the above-mentioned unit work, and the unit work is repeated to increase the depth of the grooves. Thus, the electric discharge machining is effected being divided into a plurality of times not only in the direction of width but also in the direction of depth, suppressing local variance in the machining and enhancing precision for machining the slit grooves.

It is desired that the unit work is carried out in a manner that the central region located nearly at the center is electrically discharge-machined, first, among the n regions and, then, the regions are successively machined to separate away from the central region. In this case, changes in the width of the slit grooves due to very small variance in the machining can be set to be symmetrical in the right-and-left direction. This makes it possible to improve the moldability at the time of molding the honeycomb structure by using the obtained metal mold for molding a honeycomb structure.

It is desired that in the working surface of the electrode for the electric discharge machining, every portion that contributes to the machining has the shape of a lattice corresponding to the lattice shape of the slit grooves, and has no incomplete side that does not form the lattice. In this case, it is possible to improve the machining precision at the boundaries of the neighboring electric discharge-machining portions.

It is further desired that among the plural times of the electric discharge machinings, the second and subsequent electric discharge machinings are executed by so moving the electrode for the electric discharge machining that at least one of the lattices of the working surface is overlapped on the lattice formed by the preceding electric discharge machining. In this case, it is made possible to prevent deviations in positions of the lattices of the formed slit grooves.

It is further desired that the electrode for the electric discharge machining is provided with a working solution-feeding jig for feeding a working solution for discharge working, and said working solution-feeding jig has two or more working solution injection ports. In this case, the working solution is uniformly fed onto the working surface to remove the sludge and, hence, to uniformalize the electric discharge. Therefore, this contributes to further improving the precision for forming the slit grooves.

The present invention will be more fully understood from the description of preferred embodiments of the invention set forth below together with the accompanying drawings.

DESCRIPTION OF THE PREFERRED EMBODIMENTS

The metal mold for molding a hexagonal honeycomb structure and a method of producing the same according to the embodiments of the first and second inventions will now be described with reference to FIGS. 3 to 9.

Figure 1A:
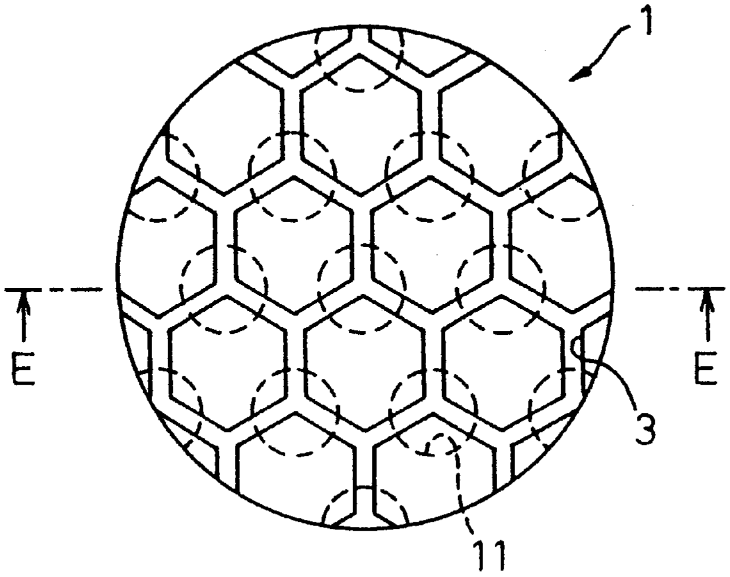
Fig.1A Related Art
FIG. 1A is a view illustrating a major portion of when the arrangement of slit grooves in a conventional metal mold for molding a hexagonal honeycomb structure is seen on a plane.
Figure 1B:
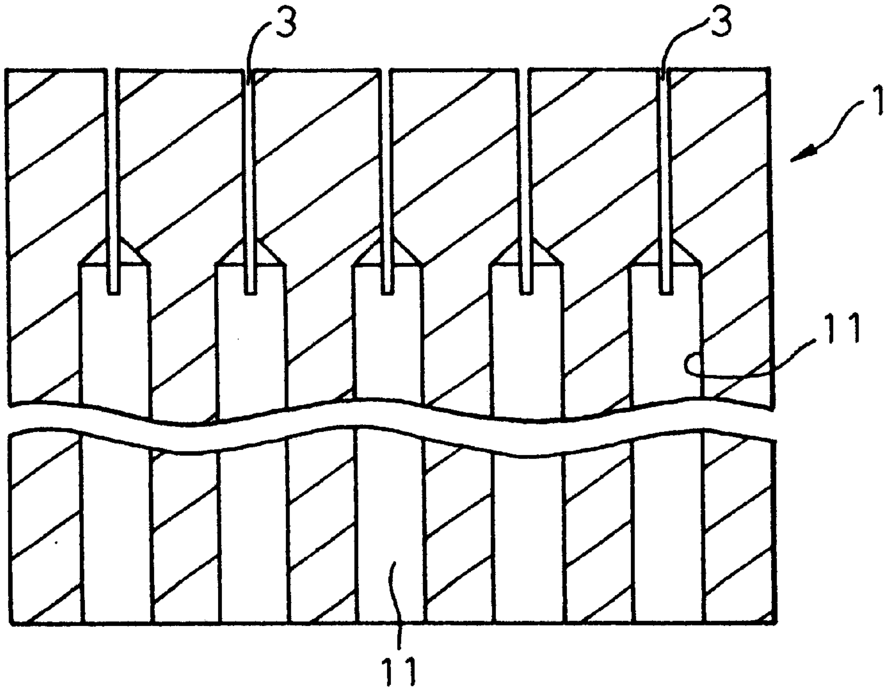
Fig.1B Related Art
FIG. 1B is a sectional view along the line E—E of FIG. 1A and illustrates the arrangement of slit grooves in the conventional metal mold for molding a hexagonal honeycomb structure.
Figure 2:
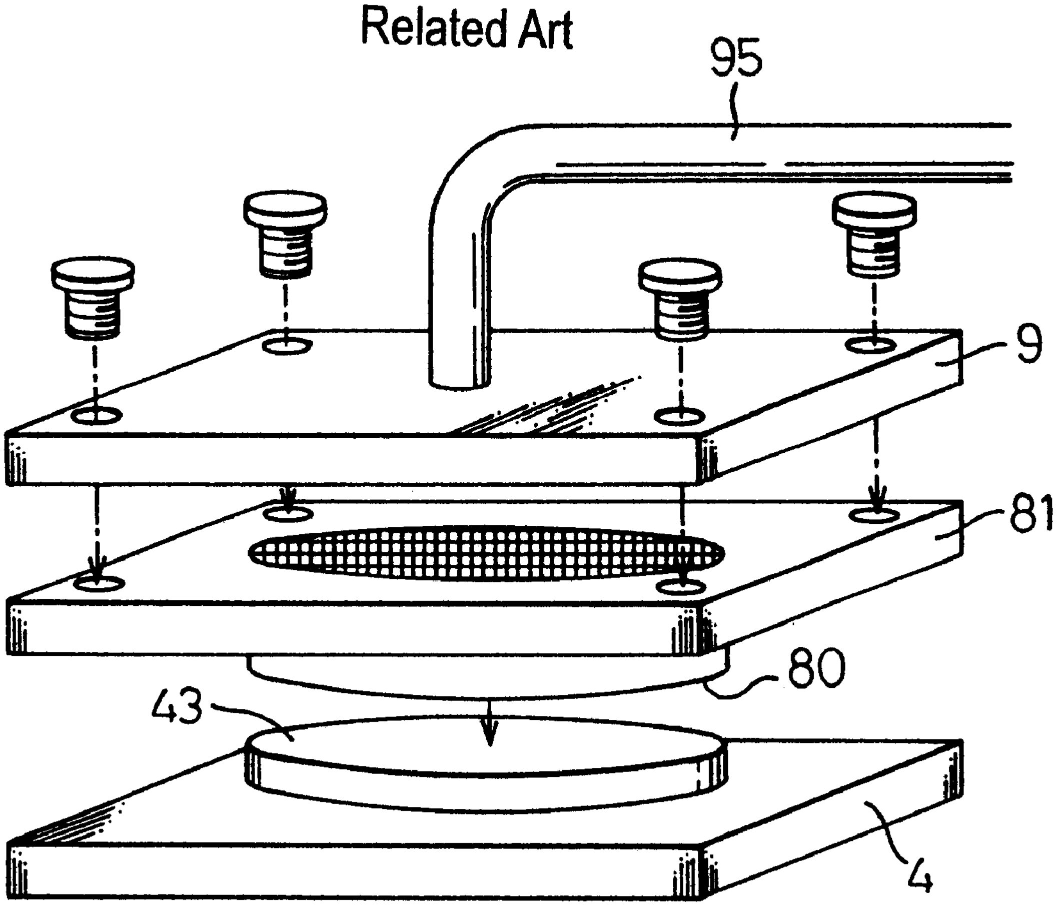
Fig. 2 Related Art
FIG. 2 is a diagram illustrating an electrode for the electric discharge machining according to a prior art.
Figure 3A:
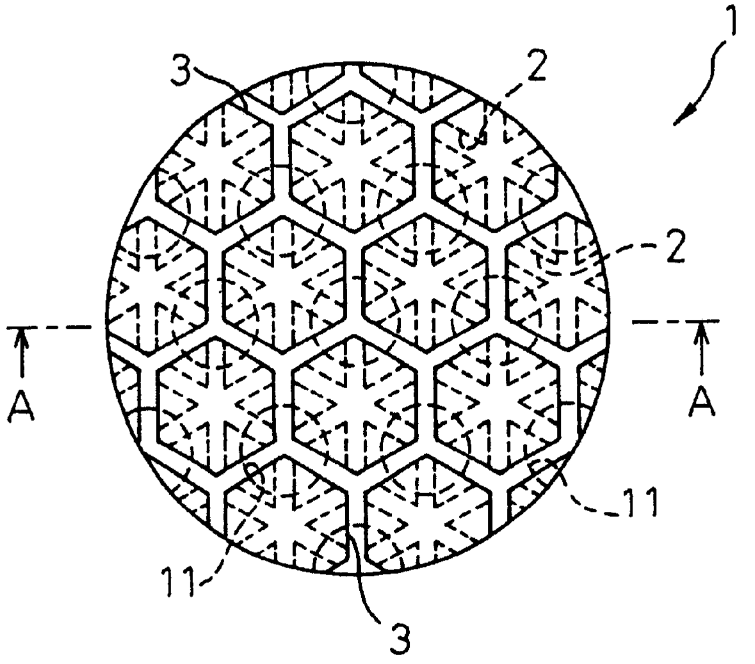
FIG. 3A is a view illustrating a major portion of when the arrangement of slit grooves in a metal mold for molding a hexagonal honeycomb structure according to an embodiment of a first invention is seen on a plane.
Figure 3B:
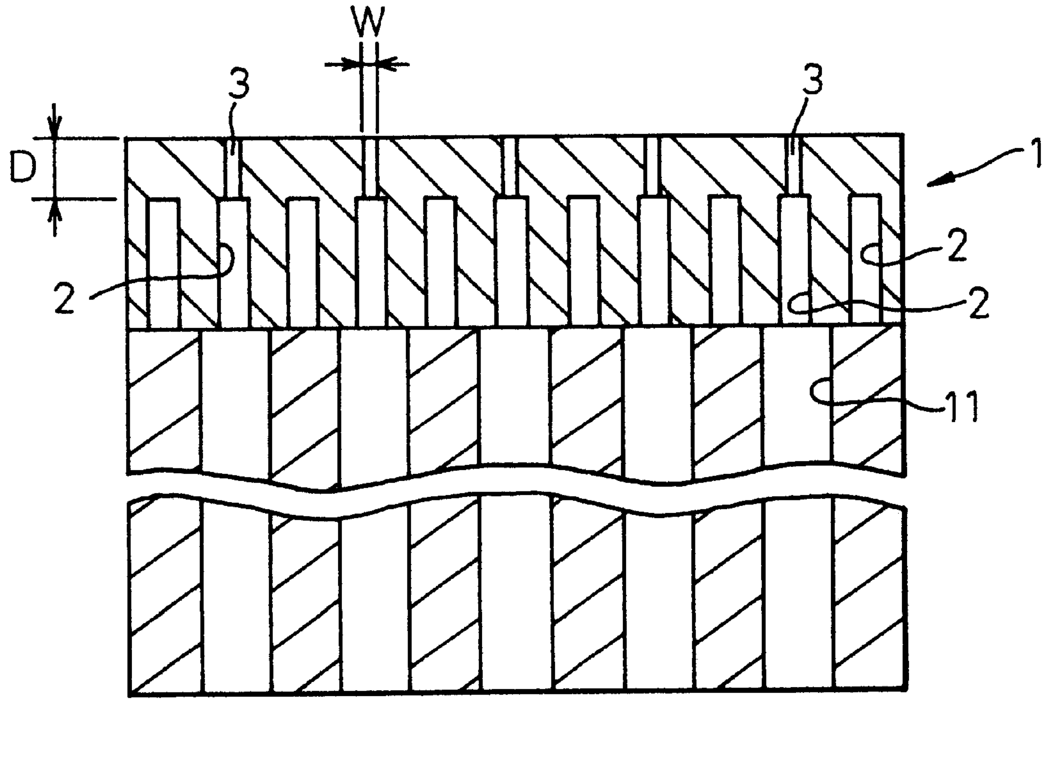
FIG. 3B is a sectional view along the line A—A of FIG. 3A and illustrates the arrangement of slits in the metal mold for molding a hexagonal honeycomb structure according to the embodiment of the first invention.

A metal mold for molding a hexagonal honeycomb structure according to the first invention has, as shown in FIG. 3, feed holes 11 for feeding a material, pool grooves 2 formed in the shape of a triangular lattice and communicated with the feed holes 11, and slit grooves 3 formed in the shape of a hexagonal lattice and communicated with the pool grooves 2. Each hexagonal lattice of the slit grooves 3 is in agreement with a hexagon shaped combining six triangular lattices of the pool grooves 2.

That is, when the slit grooves 3 and the pool grooves 2 of the metal mold 1 for molding a hexagonal honeycomb structure are viewed from the front, as shown in FIG. 3, the pool grooves 2 are located at portions overlapped on the slit grooves 3 of the hexagonal shape and on the boundary portions of the six triangles formed by connecting the vertexes thereof and the centers thereof.

The depth D of the slit grooves 3 is not larger than 10 times of the width W of the slit grooves 3.

Figure 4:
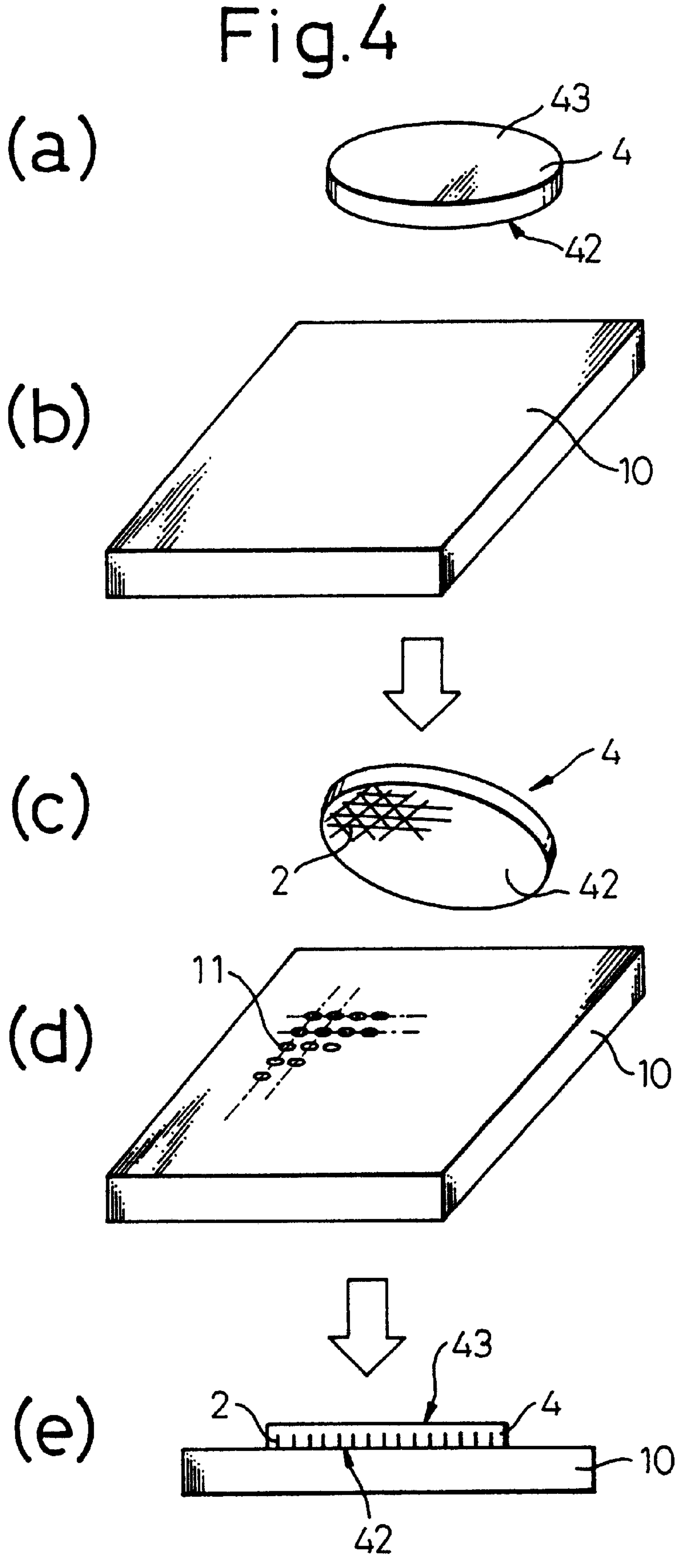
FIG. 4 is a view illustrating the steps for producing the metal mold for molding a hexagonal honeycomb structure according to an embodiment of a second invention.

To produce the metal mold 1 for molding a hexagonal honeycomb structure according to the second invention as shown in FIGS. 4(*a*) and 4(*b*), first, there are prepared a metal mold base 10 for forming the feed holes 11 and a groove-forming member (metal mold blank) 4 having a pool groove-forming surface 42 and a slit groove-forming surface 43.

Then, as shown in FIGS. 4(*c*) and 4(*d*), the feed holes 11 are formed in the metal mold base 10 so as to penetrate therethrough, and a plurality of pool grooves intersecting at an angle of about 60 degrees relative to each other are formed in the shape of a triangular lattice in the pool groove-forming surface 42 of the groove-forming member 4.

Then, as shown in FIG. 4(*e*), the pool groove-forming surface 42 of the groove-forming member 4 is joined to the metal mold base 10. Thereafter, slit grooves 3 of the shape of a hexagonal lattice are formed in the slit groove-forming surface 43 of the groove-forming member 4 so as to be communicated with the pool grooves 2.

The feed holes 11 are formed in the metal mold base 10 by drilling.

Figure 5:
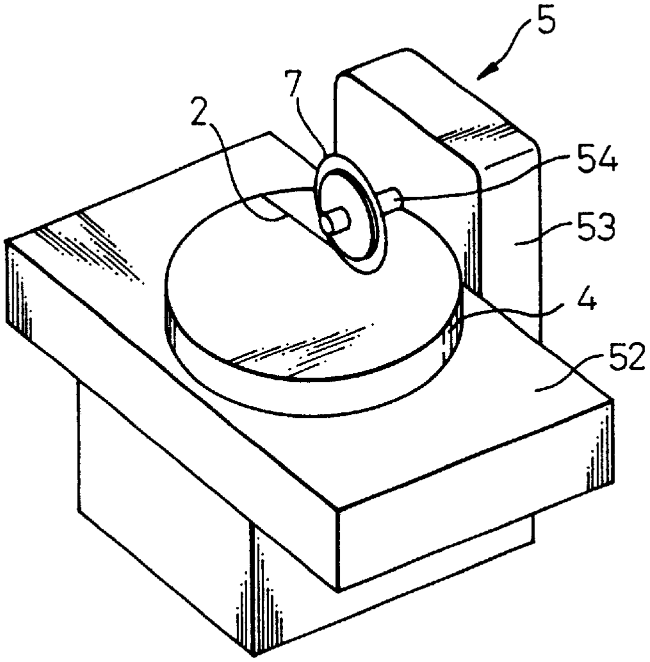
FIG. 5 is a perspective view of a groove machining device for forming the pool grooves according to the embodiment.

The pool grooves 2 are formed in the groove-forming member 4 by using a groove machining device 5 shown in FIG. 5. The groove machining device 5 comprises a table 52 on which the groove-forming member 4 will be set, and a tool support portion 53 for rotatably supporting a rotary tool 7. The tool support portion 53 supports the rotary tool 7 through a rotary shaft 54. The table 52 is so constituted as can be moved in the longitudinal and transverse directions and up and down according to a preset order. As the rotary tool 7, there is used a circular thin-blade grind-stone having a thickness of 150 $\mu$m.

Figure 6:
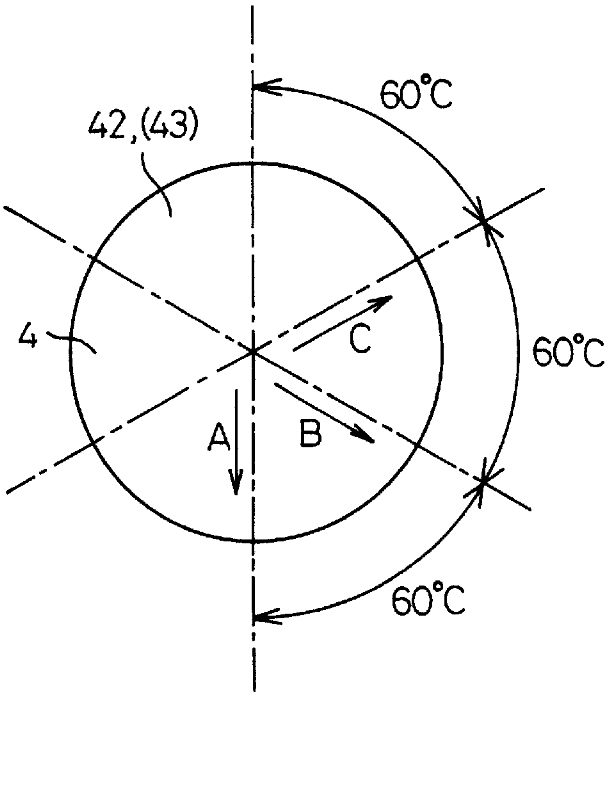
FIG. 6 is a view illustrating a procedure for forming the pool grooves according to the embodiment.

As shown in FIG. 6, furthermore, the pool grooves 2 are formed in a plural number in parallel in the pool groove-forming surface 42 of the groove-forming member 4 in the direction of an arrow A. In this case as shown in FIG. 7B, the depth of the pool groove 2 is about 70% of the thickness of the groove-forming member 4. Then, similarly, the pool grooves 2 are formed in a plural number in parallel in the direction of an arrow B tilted by 60 degrees with respect to the direction of the arrow A. Similarly, furthermore, the pool grooves 2 are formed in a plural number in parallel in the direction of an arrow C tilted by 60 degrees with respect to the arrow A and the direction B.

Figure 7A:
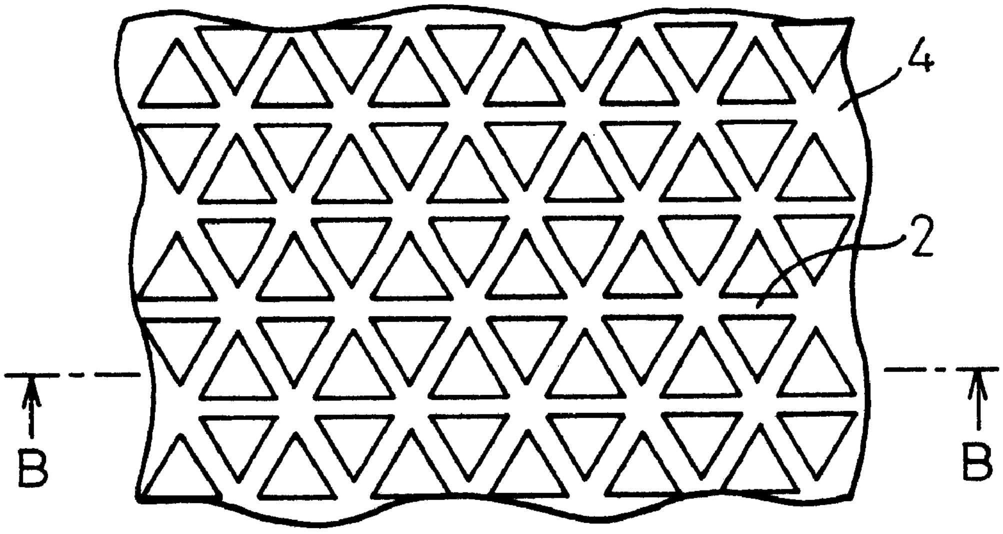
FIG. 7A is a diagram of when the pool groove-forming surface of the groove-forming member (metal mold blank) according to the embodiment of the second invention is seen on a plane.
Figure 7B:
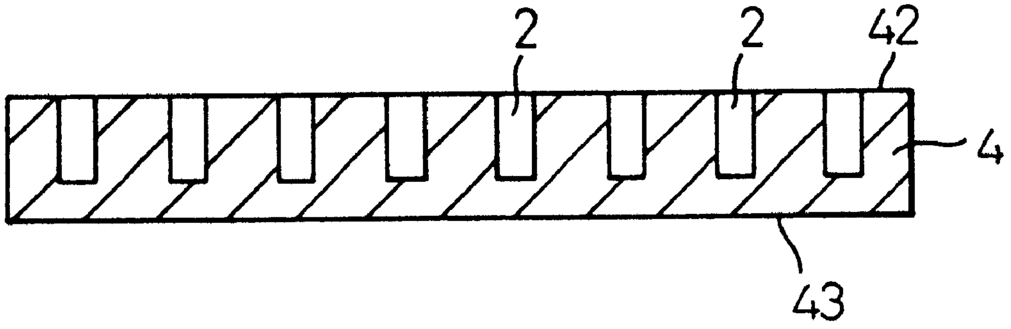
FIG. 7B is a sectional view along the line B—B of FIG. 7A and illustrates the pool groove-forming surface of the groove-forming member according to the embodiment of the second invention.

As shown in FIGS. 7A and 7B, therefore, the pool grooves 2 of the shape of a triangular lattice are formed having the above-mentioned depth in the pool groove-forming surface of the groove-forming member 4.

Next, the pool groove-forming surface 42 of the groove-forming member 4 and the metal mold base 10 are joined together relying on the diffusion bonding method. Concretely speaking, the metal base 10 and the groove-forming member 4 are pressurized in a state of being contacted to each other at a temperature of not lower than 1000° C. in vacuum.

Figure 8:
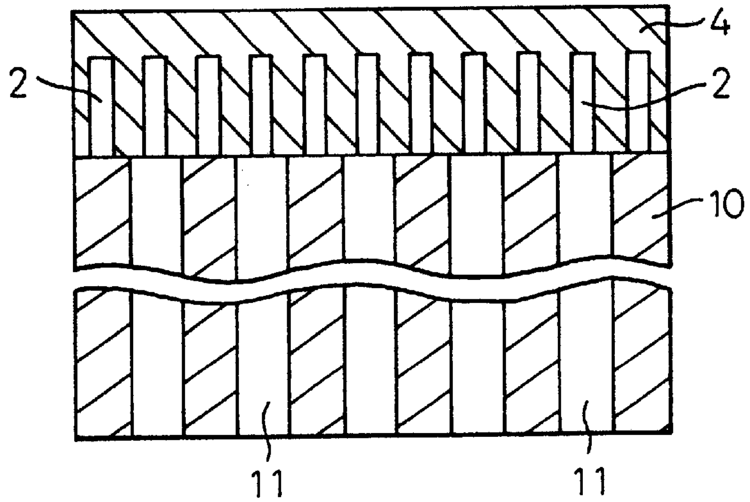
FIG. 8 is a view illustrating a state where the groove-forming member and the metal mold base are joined together according to the embodiment of the second invention.

As shown in FIG. 8, therefore, the pool grooves 2 and the feed holes 11 are communicated with each other.

The slit grooves 3 are formed by the electric discharge machining. Concretely speaking, an electrode is prepared having the same shape as the hexagonal lattice that is to be obtained and a thickness smaller than the width of the slit grooves. By using this electrode, the electric discharge machining is effected from the slit groove-forming surface 43 of the groove-forming member 4. Here, the hexagonal lattice of the electrode is so positioned as to be brought into agreement with a hexagon shaped by combining six triangular lattices of the pool grooves.

As a result of the electric discharge machining, the slit grooves 3 of the shape of a hexagonal lattice are formed, as shown in FIG. 3, being communicated with the pool grooves 2, and there is obtained the metal mold 1 for forming a hexagonal honeycomb structure.

Next, in this embodiment, the form of the slit groove-forming surface 42 of the metal mold 1 for molding a hexagonal honeycomb structure is shaped by cutting, and a guide ring (not shown) is arranged thereon. Then, the material is fed through the feed holes 11 of the metal mold 1 to practically extrusion-mold a hexagonal honeycomb structure. As a result, despite the depth of the slit grooves 3 is smaller-than 10 times of the width of the slit grooves, which is smaller than the depth of the prior art as described above, the molded hexagonal honeycomb structure features a uniform thickness of the partitioning walls and a uniform cellular shape. It will thus be understood that the metal mold 1 for molding a hexagonal honeycomb structure of this embodiment exhibits very excellent moldability.

The reasons are as described below.

Figure 9:
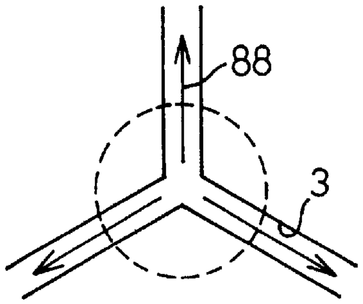
FIG. 9 is a view illustrating the flow of a material according to the embodiment.
Figure 9:
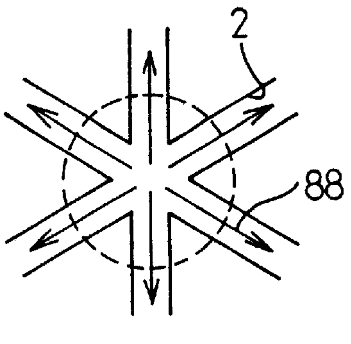

According to the prior art as shown in FIG. 9(*a*), a material 88 directly flows into the slit grooves 3 of the shape of a hexagonal lattice from the feed holes 11. According to this embodiment as shown in FIG. 9(*b*), on the other hand, the material 88 flows into the slit grooves 3 after it has once flown into the pool grooves 2 of the shape of a triangular lattice. Therefore, the flow of the material 88 is stepwisely adjusted, enabling the material flowing into the slit grooves 3 to be more. uniform than ever before.

As described above, the metal mold for molding a hexagonal honeycomb structure of the first invention has the pool grooves formed between the slit grooves and the feed holes.

Therefore, the material fed through the feed holes at the time of molding the honeycomb structure flows, first, into the pool grooves in the form of a triangular lattice in a dispersed manner and, then, flows into the slit grooves of the shape of a hexagonal lattice from the pool grooves. Accordingly, the flow of the material undergoes a change in two steps of when it has entered into the pool grooves and when it has entered into the slit grooves.

Concretely speaking, the pool grooves are of the shape of a triangular lattice, and the material is radially dispersed into six directions at the intersecting point of the triangular lattices and advances through the pool grooves. Then, at the time of entering into the slit grooves of the shape of a hexagonal lattice, the state of dispersion into the six directions changes into the state of dispersion into the three directions.

As the flow of the material is stepwisely adjusted, the material flows into the slit grooves more uniformly than ever before, contributing to improving the moldability of the honeycomb structure.

Since the flow of the material into the slit grooves is uniform as described above, a sufficient degree of moldability is maintained despite the slit grooves being formed with a depth smaller than that of the prior art. Accordingly, the depth of the slit grooves that hitherto had to be set to be larger than 10 times of the width of the slit grooves can now be decreased to be not larger than 10 times of the width of the slit grooves. This makes it possible to greatly shorten the time for forming the slit grooves compared with that of the prior art and to improve the precision of formation.

According to the production method of the second invention, furthermore, the metal mold 1 for molding a hexagonal honeycomb structure is produced by using two members, i.e., the groove-forming member 4 and the metal mold base 10 as described above. This makes it possible to work the groove-forming member 4 from both surfaces thereof. That is, the pool grooves 2 are formed in the pool groove-forming surface 42 of the groove-forming member 4 and, thereafter, the slit grooves 3 are formed in the slit groove-forming surface 43. Therefore, the pool grooves 2 are formed by cutting and the grooves 3 are formed by the electric discharge machining, which are the machining methods best suited therefor, respectively.

Upon forming the pool grooves 2 as described above, furthermore, the depth D of the slit grooves 3 can be selected to be smaller than that of the prior art. Despite the slit grooves 3 being formed by the electric discharge machining, therefore, the time required for the machining can be greatly shortened compared to that of the prior art and, besides, the machining precision can be improved.

According to this embodiment, therefore, a metal mold 1 for molding a hexagonal honeycomb structure, that exhibits good moldability, can be easily obtained relying upon the above-mentioned excellent method of production.

The method of producing the metal mold for molding a hexagonal honeycomb structure according to an embodiment of the third invention will now be described with reference to FIGS. 10 to 12.

Figure 10A:
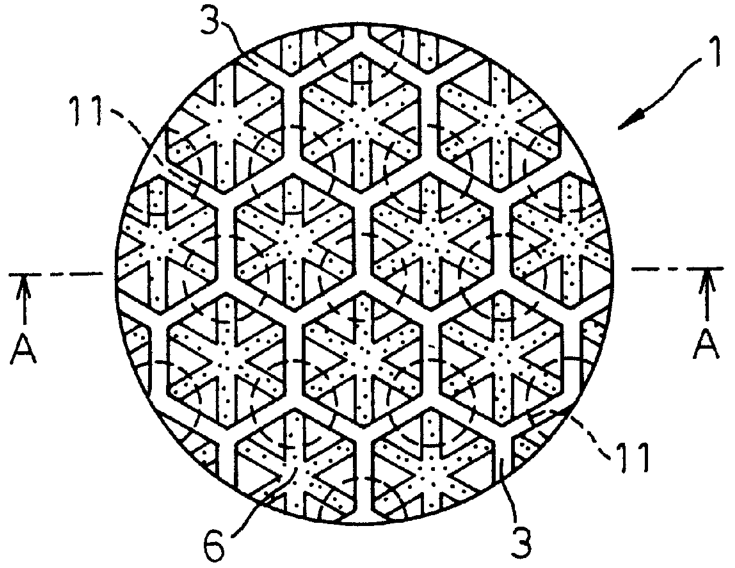
FIG. 10A is a view illustrating a major portion of when the arrangement of slit grooves in the metal mold for molding a hexagonal honeycomb structure according to an embodiment of a third invention is seen on a plane.
Figure 10B:
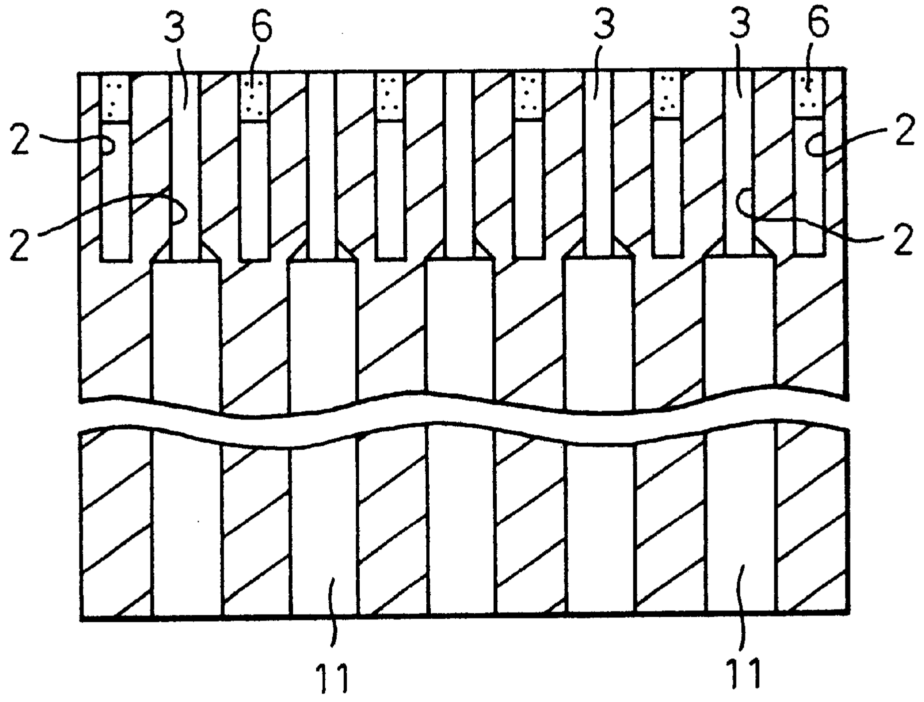
FIG. 10B is a sectional view along the line A—A of FIG. 10A and illustrates the arrangement of slit grooves in the metal mold for molding a hexagonal honeycomb structure according to the embodiment of the third invention.

The metal mold 1 for molding a hexagonal honeycomb structure produced according to this embodiment has, as shown in FIG. 10, feed holes 11 for feeding a material, pool grooves 2 formed in the shape of a triangular lattice and communicated with the feed holes 11, and slit grooves 3 formed in the shape of ahexagonal lattice and communicated with the pool grooves 2. Each hexagonal lattice of the slit grooves 3 is so formed as to come into agreement with a hexagon shaped by combining six triangular lattices of the pool grooves 2.

That is, when the slit grooves 3 and the pool grooves 2 of the metal mold 1 for molding a hexagonal honeycomb structure of this embodiment are viewed from the front, as shown in FIG. 10, the pool grooves 2 are located at portions overlapped on the slit grooves 3 of the hexagonal shape and on the boundary portions of the six triangles formed by connecting the vertexes thereof and the centers thereof.

Figure 11:
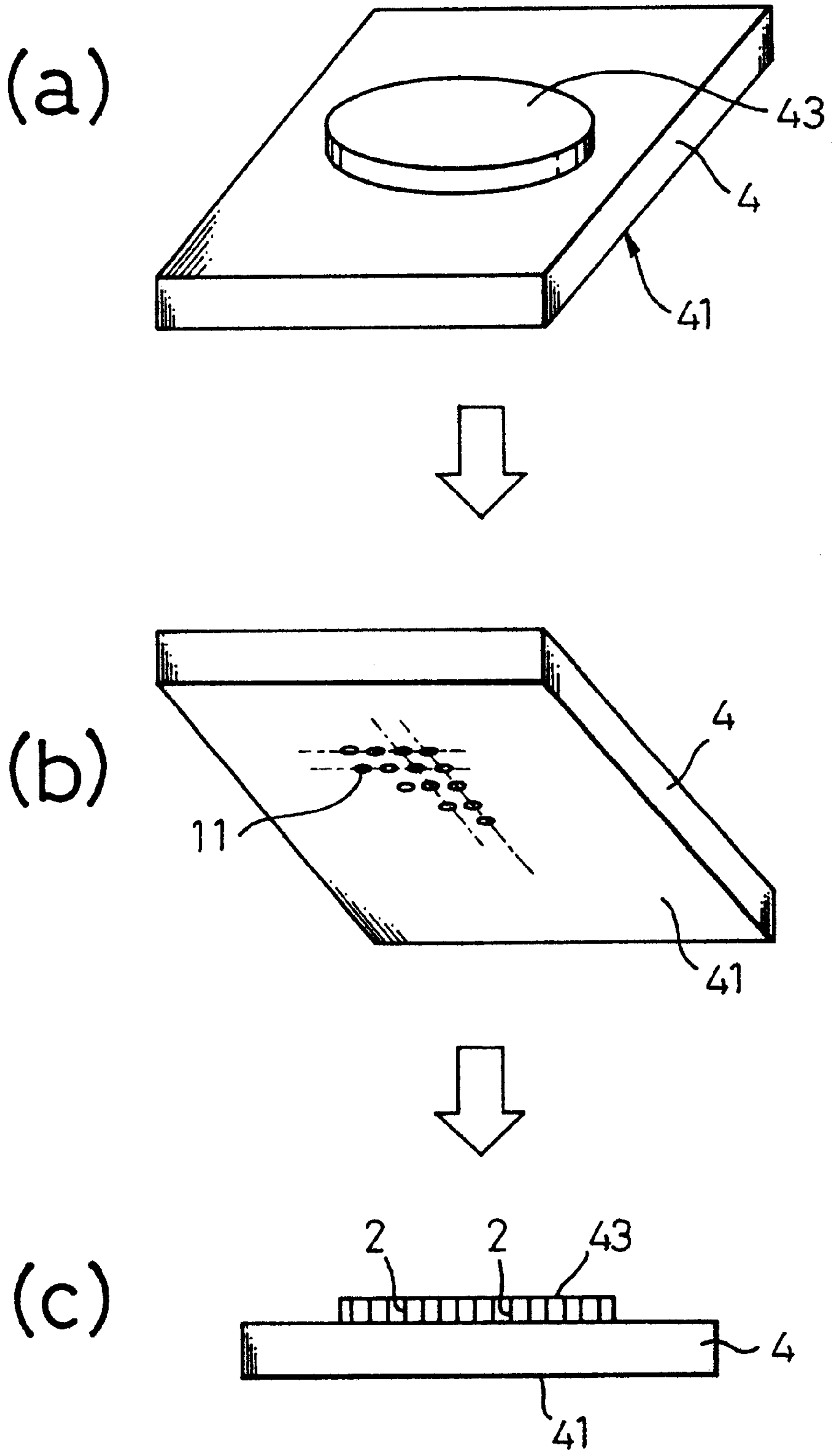
FIG. 11 is a view illustrating the steps for producing the metal mold for molding a hexagonal honeycomb structure according to the embodiment of the third invention.

To produce the metal mold 1 for molding a hexagonal honeycomb structure as shown in FIG. 11(*a*), there is prepared a metal mold blank (groove-forming member) 4 having a feed hole-forming surface 41 and a slit groove-forming surface 43.

Then, as shown in FIG. 11(*b*), the feed holes 11 of a predetermined depth are formed in the feed hole-forming surface 41 of the metal mold blank 4. The feed holes 11 are formed in the metal mold blank 4 by drilling.

As shown in FIG. 11(*c*) and FIG. 6, on the other hand, a plurality of pool grooves 2 intersecting at an angle of about 60 degrees relative to each other are formed in the form of a triangular lattice in the slit groove-forming surface 43 of the metal mold blank 4. Then, the pool grooves 2 are closed except those of the hexagonal lattice portion where the slit grooves 3 are to be arranged, thereby to form the slit grooves 3.

The pool grooves 2 are formed in the slit groove-forming surface 43 of the metal mold blank 4 by using a groove machining device 5 shown in FIG. 5. The groove machining device 5 comprises a table 52 on which the metal mold blank 4 will be set, and a tool support portion 53 for rotatably supporting a rotary tool 7. The tool support portion 53 supports the rotary tool 7 through a rotary shaft 54. The table 52 is so constituted as can be moved in the longitudinal and transverse directions and up and down according to a preset order. As the rotary tool 7, there is used a circular thin-blade grind-stone having a thickness of 150 $\mu$m.

Figure 12A:
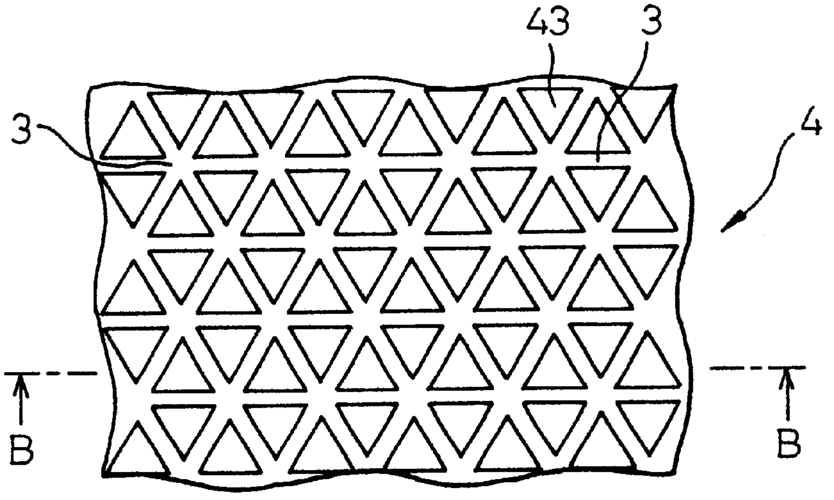
FIG. 12A is a view illustrating the pool grooves formed in the metal mold blank according to the embodiment of the third invention as seen from the front.

As shown in FIG. 6, furthermore, the pool grooves 2 are formed in a plural number in parallel in the slit groove-forming surface 43 of the metal mold blank 4 in the direction of an arrow A. In this case as shown in FIG. 12A, the pool grooves 2 are deep enough to be communicated with the feed holes 11 in the metal mold blank 4. Then, similarly, the pool grooves 2 are formed in a plural number in parallel in the direction of an arrow B tilted by 60 degrees with respect to the direction of the arrow A. Similarly, furthermore, the pool grooves 2 are formed in a plural number in parallel in the direction of an arrow C tilted by 60 degrees with respect to the arrow A and the direction B.

Figure 12B:
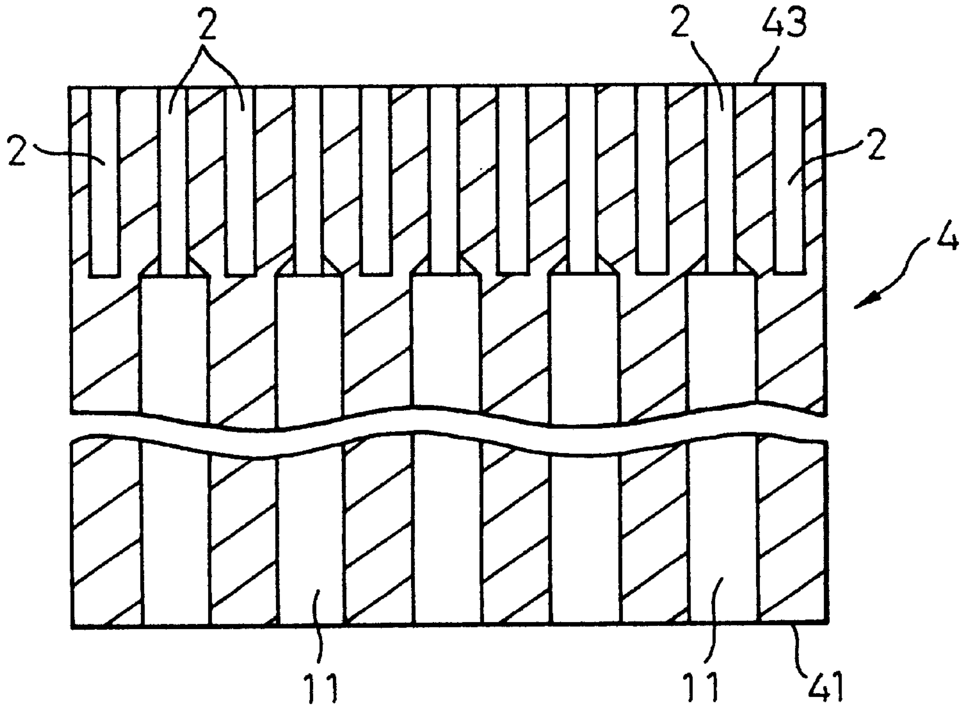
FIG. 12B is a sectional view along the line B—B of FIG. 12A and illustrates the pool grooves formed in the metal mold blank according to the embodiment of the third invention.

As shown in FIGS. 12A and 12B, therefore, the pool grooves 2 of the shape of a triangular lattice are formed having the above-mentioned depth in the slit groove-forming surface 43 of the metal mold blank 4.

Next, in this embodiment, the pool grooves 2 are closed by stuffing all the pool grooves 2 of the shape of the triangular lattice with a closing agent 6. In this embodiment, a metal powder is used as the closing agent 6.

Next, the closing agent 6 is selectively coagulated in the pool grooves 2 except those in the hexagonal lattice portion where the slit grooves 3 are to be arranged. Concretely speaking, the closing agent 6 is selectively irradiated with a laser beam and is heated and sintered to accomplish the selective closing.

Then, the uncoagulated closing agent in the slit grooves is removed. Therefore, the pool grooves 2 that are not closed, serve as slit grooves 3 to form partitioning walls.

Upon forming the slit grooves 3, there is obtained a metal mold 1 for molding a hexagonal honeycomb structure constituted as shown in FIG. 10.

According to the third invention as described above, the slit grooves 3 of the shape of a hexagonal lattice are formed by closing part of the pool grooves 2 of the shape of the triangular lattice. Therefore, the pool grooves of the shape of the triangular lattice only may be formed in the metal mold blank 4. Moreover, the pool grooves 2 can be formed by a method in which the operation for forming a plurality of straight grooves in parallel are executed from the three directions so as to be intersected at an angle of about 60 degrees. Therefore, there is no need to employ a poorly efficient electric discharge machining method that was so far employed, and the time for forming the grooves can be greatly shortened.

Since the slit grooves 3 are formed by closing part of the pool grooves 2 as,described above, each hexagonal lattice of the slit grooves 3 is so formed as to come into agreement with a hexagon shaped by combining six triangular lattices of the pool grooves 2. It is therefore allowed to improve the moldability over the prior art in forming a hexagonal honeycomb structure by using the metal mold 1.

This is due to the same reasons as those described above with reference, to FIG. 9.

In this embodiment, the pool grooves are closed by being stuffed with the closing agent 6 composed of a metal powder, which is then selectively coagulated upon irradiation with a laser beam as described above. In its place, it is also allowable to use various other methods such as laser beam welding and the like.

The method of producing the metal mold for molding a honeycomb structure according to an embodiment of the fourth invention will now be described with reference to FIGS. 13 to 21.

Figure 13A:
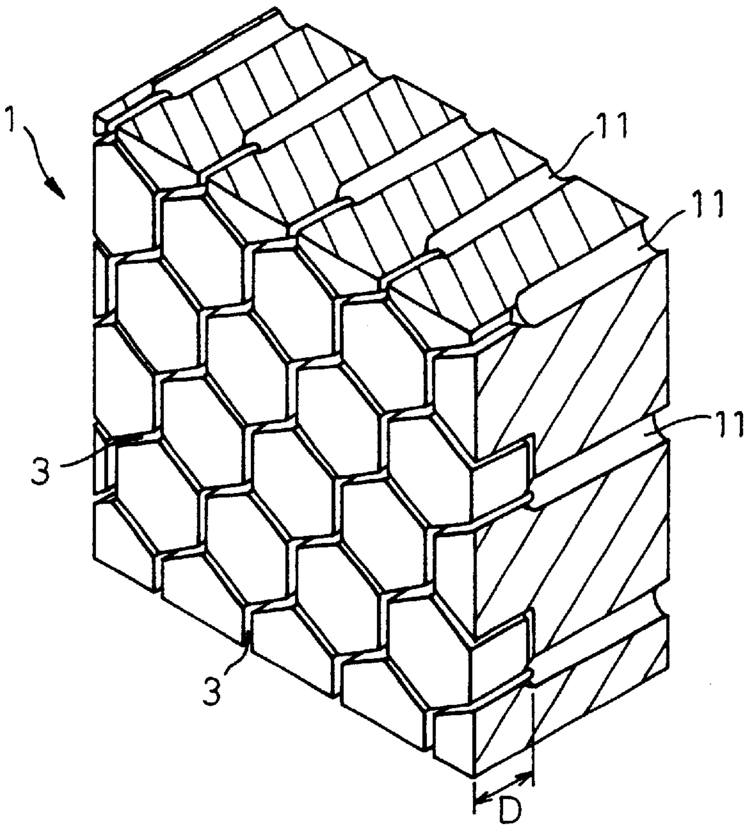
FIG. 13A is a partly cut-away sectional perspective view of the metal mold for molding a honeycomb structure according to an embodiment of a fourth invention.
Figure 13B:
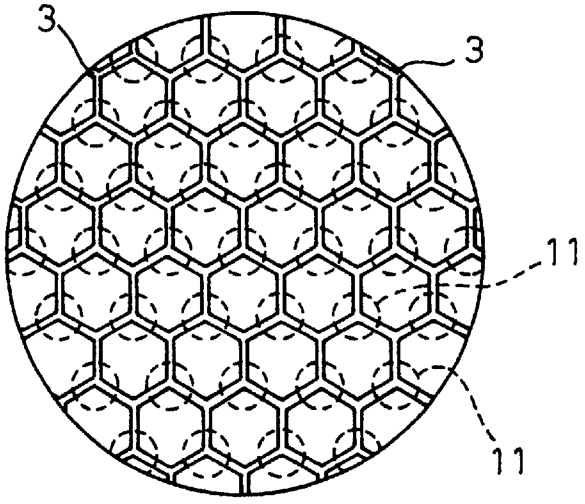
FIG. 13B is a front view illustrating a major portion of the metal mold for molding a honeycomb structure according to the embodiment of the fourth invention.

As shown in FIG. 13, this example is concerned with a method of producing the metal mold 1 for molding a honeycomb structure having a plurality of feed holes 11 for feeding a material and slit grooves 3 formed in the shape of a lattice being communicated with the feed grooves 11 to form the material into a honeycomb.

Referring to FIGS. 15 to 18, the slit grooves 3 are formed by electric discharge-machining the groove-forming surface 43 of the metal mold blank 4 a plural number of times by using a small electrode 81 for the electric discharge machining having a working surface 80 of an area smaller than the area of the groove-forming surface 43.

As shown in FIG. 13, the metal mold 1 for molding a honeycomb structure produced by this embodiment has slit grooves 3 of the shape of a hexagonal lattice.

Figure 14:
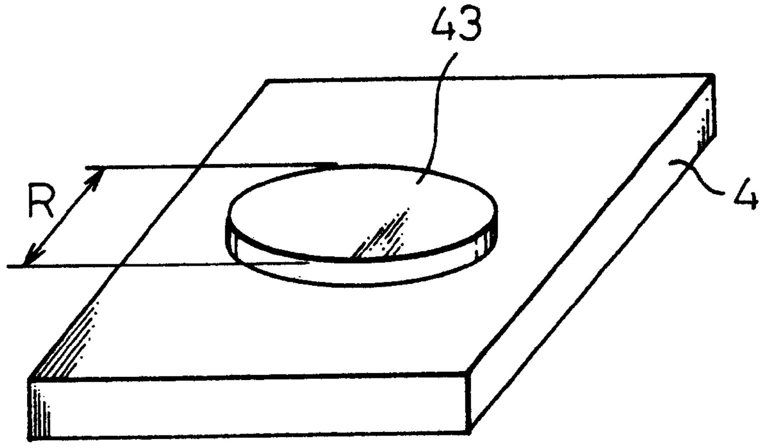
FIG. 14 is a view illustrating a procedure for producing the metal mold for molding a honeycomb structure according to the embodiment of the fourth invention.
Figure 14:
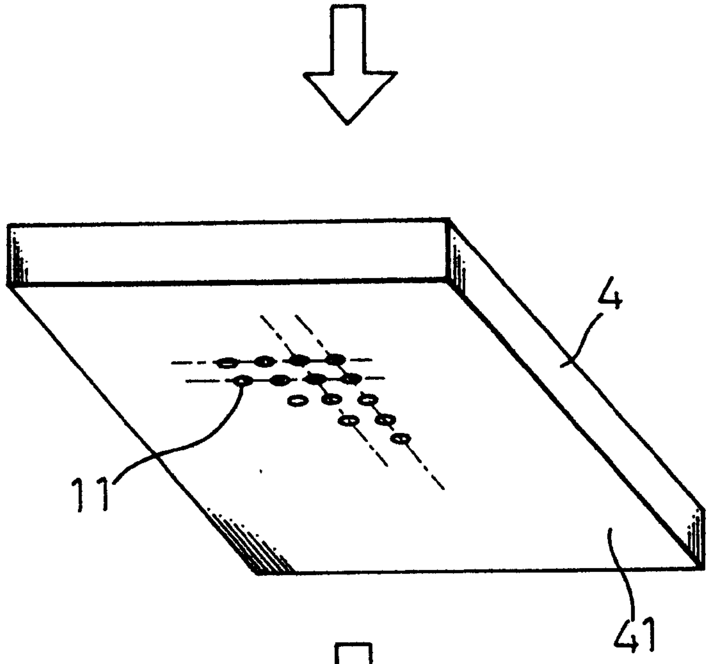
Figure 14:
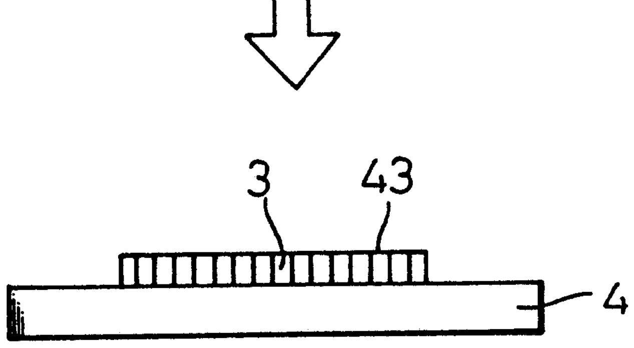

To produce the metal mold 1 for molding a honeycomb structure as shown in FIG. 14(*a*), first, there is prepared a metal mold blank 4 having a groove-forming surface 43 and a hole-forming surface 41.

Then, as shown in FIG. 14(*b*), a number of feed holes 11 are formed in the hole-forming surface 41 of the metal mold blank 4 by drilling.

Figure 18:
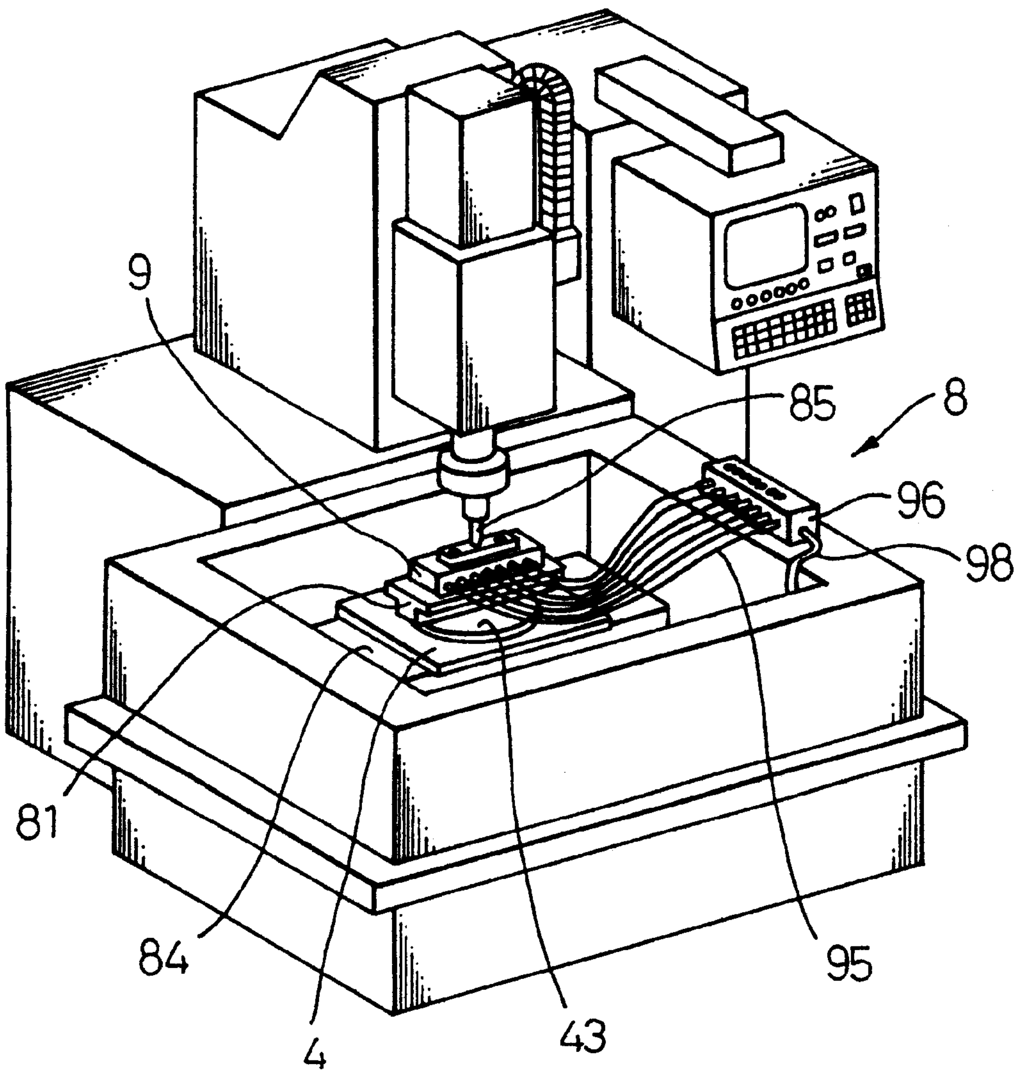
FIG. 18 is a view illustrating an electric discharge machining apparatus according to the embodiment of the fourth invention.

Thereafter, as shown in FIG. 14(*c*), and FIG. 18, the slit grooves 3 of the shape of a hexagonal lattice are formed by the electric discharge machining.

Figure 15:
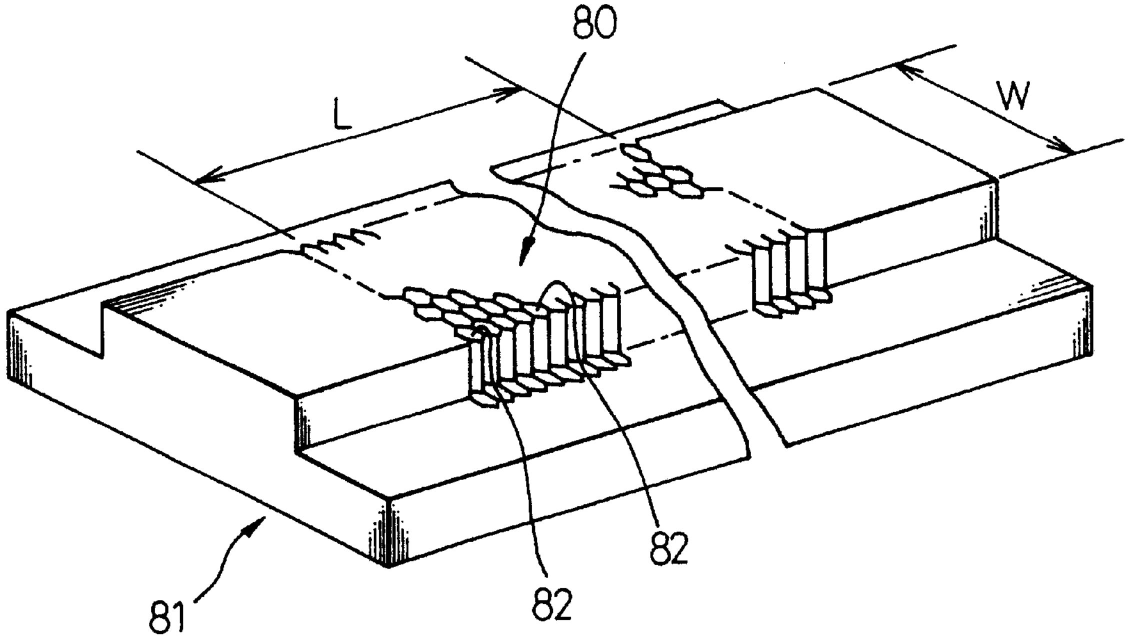
FIG. 15 is a perspective view of an electrode for the electric discharge machining according to the embodiment of the fourth invention.
Figure 16:
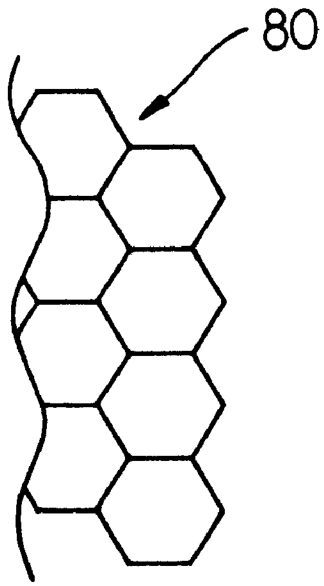
FIG. 16 is a view concretely illustrating an example without incomplete side (a) and an example with incomplete side (b) in the embodiment of the fourth invention.
Figure 16:
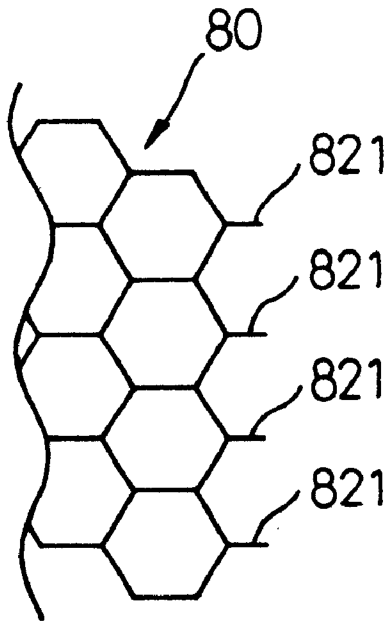

In the electric discharge machining as shown in FIGS. 15 and 16, use is made of a small electrode 81 for the electric discharge machining. In the electrode 81 for the electric discharge machining of this embodiment, the working surface 80 has a length L which is larger than the width (diameter) R of the groove-forming surface 43 of the metal mold blank 4 and has a width W which is smaller than the width R of the groove-forming surface 43.

If described more concretely, the working surface 80 has hexagonal lattices 82 of 15 columns in the direction of width which has a size W. The size W of width is about one-ninth the width R of the groove-forming surface 43.

On the working surface 80 of the electrode 81 for the electric discharge machining, furthermore, every portion that contributes to the machining has the shape of a hexagonal lattice 82 but has no incomplete side that does not form a lattice. Concretely speaking as shown in FIG. 16(*a*), the electrode has the shape of a hexagonal lattice 82 even at the ends of the working surface 80, but does not have incomplete sides 821 that do not constitute a hexagon as shown in FIG. 16(*b*).

The hexagonal lattices 82 are formed in the working surface 80 of the electrode 81 for the electric discharge machining so as to penetrate through up to the back surface 83.

Figure 17:
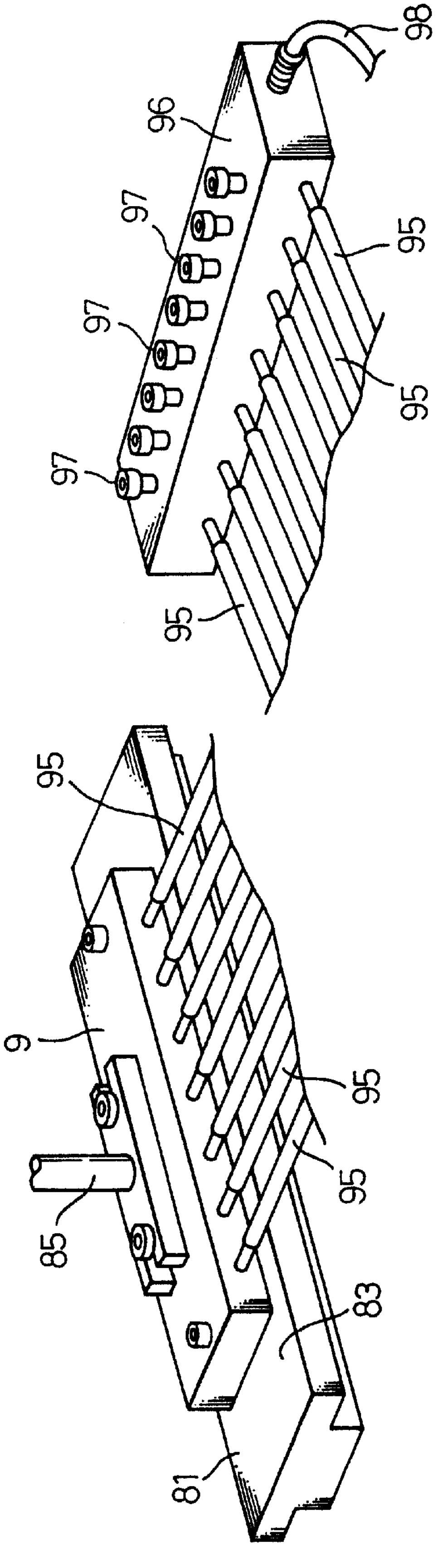
FIG. 17 is a view illustrating a state where the electrode for the electric discharge machining is connected to a working solution-feeding jig according to the embodiment of the fourth invention.

Referring to FIG. 17, furthermore, a jig 9 for feeding a working solution is disposed on the back surface 83 of the electrode 81 for the electric discharge machining.

Seven feed pipes 95 for feeding the working solution are connected to the jig 9 for feeding the working solution, and seven working solution injection ports (not shown) are formed in the contacting surface of the electrode to correspond to these feed pipes. The seven feed pipes 95 are connected on their upstream side to a branch jig 96 that adjusts the distribution and flow rate of the working solution to the feed pipes 95. The branch jig 96 is connected to an introduction pipe 98 through which the working solution is introduced from the upstream side, and is provided with seven knobs 97 for adjusting the flow rate for the feed pipes 95.

Referring to FIG. 18, furthermore, the electrode 81 for the electric discharge machining on which the working solution-feeding jig 9 is arranged, is set to an electric discharge-machining apparatus 8 and is used.

The electric discharge-machining apparatus 8 has a table 84 on which the metal mold blank 4 will be set, and a head 85 for holding the electrode 81 for the electric discharge machining. As shown in FIG. 17, the head 85 moves up and down as well as right and left in a state where the electrode 81 for the electric discharge machining and the working solution-feeding jig 9 are secured to the end of the head 85.

Figure 19:
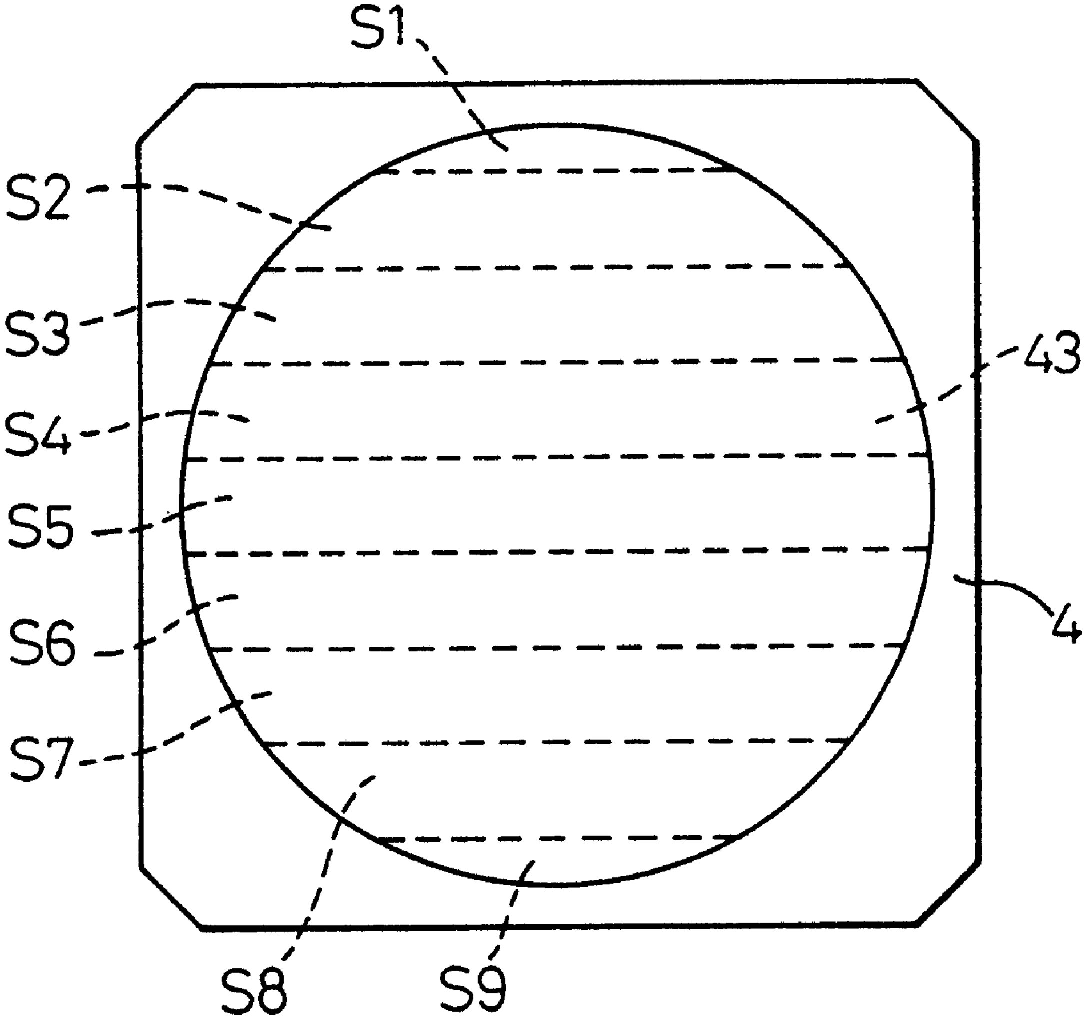
FIG. 19 is a view illustrating the divided regions to be electrically discharge-machined according to the embodiment of the fourth invention.
Figure 20:
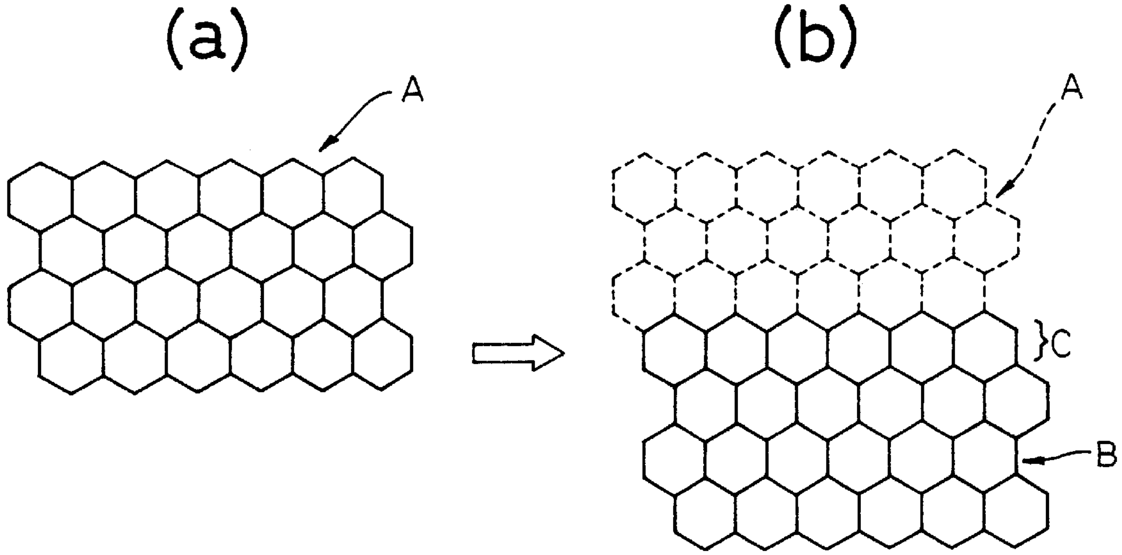
FIG. 20 is a view illustrating a moved position of the electrode for the electric discharge machining according to the embodiment of the fourth invention.

Next, described below with reference to FIG. 19 is a procedure for forming the slit grooves in the groove-forming surface 43 of the metal mold blank 4.

As shown, the groove-forming surface 43 is divided into nine regions S1 to S9 in the direction of width. These regions S1 to S9 have a width slightly smaller than the width W of the working surface 80 of the electrode 81 for the electric discharge machining.

The nine regions S1 to S9 are subjected to the electric discharge machining by using the electrode 81 for the electric discharge machining.

According to this embodiment, one region is electrically discharge-machined up to a desired depth of the slit grooves and, then, the electrode 81 for the electric discharge machining is moved to the neighboring region where the electric discharge machining is executed to accomplish a desired depth D (FIG. 13A) of the slit grooves. The electric discharge machining is repeated nine times to complete the formation of the slit grooves 3.

The electrode 1 for the electric discharge machining is so moved that the lattices of at least one column of the working surface 80 are overlapped on the lattices that have been formed by the preceding electric discharge machining. Concretely speaking, when the lattices B of slit grooves (FIG. 10(*b*)) are to be newly formed by the side of the lattices A of slit grooves (FIG. 20(*a*)) that have been formed by the preceding electric discharge machining, the electrode 81 for the electric discharge machining is so moved that the lattices C of one column of the two groups are overlapped one upon the other.

When worn out, the electrode 81 for the electric discharge machining is replaced by a new one. For example, when the electrode 81 for the electric discharge machining is to be replaced every after two times of the electric discharge machining, then, a total of four electrodes 81 for the electric discharge machining are used.

The actions and effects of the embodiment will now be described.

According to the method of producing the metal mold for molding a honeycomb structure of the fourth invention, the size of the working surface 80 of the electrode 81 for the electric discharge machining is greatly decreased compared with that of the prior art. Therefore, the electrode 81 for the electric discharge machining is little deformed by distortion compared with that of the prior art, and the local dispersion in the electric discharging condition can be decreased during the electric discharge machining. This makes it possible to decrease the deformation, wear and dispersion of the electrode 81 for the electric discharge machining.

According to this embodiment, in particular, since the working solution injection ports are formed at seven places, the working solution can be uniformly fed in sufficient amounts to the working portions. This improves the effect for removing the sludge and, hence, to make uniform the electric discharge during the electric discharge machining. Accordingly, the electrode is suppressed from being worn out in a deviated manner, and the depth of the slit grooves can be precisely controlled.

In this embodiment, furthermore, the working surface 80 of the electrode 81 for the electric discharge machining has no incomplete side. Among the plural times of the electric discharge machinings, furthermore, the second and subsequent electric discharge machinings are executed by so moving the electrode 81 for the electric discharge machining that the lattices of one column of the working surface are overlapped on the lattices that have been formed by the preceding electric discharge machining. It is therefore possible to prevent the deviation in position of the lattices of the obtained slit grooves and to improve the machining precision at the boundary portions of the electric discharge machining that is executed repetitively.

As described above, furthermore, it is possible to suppress dispersion in the electric discharge depending upon the locations during the electric discharge machining compared to that of the prior art.

As described above, furthermore, since the area of the working surface 80 is decreased to be smaller than that of the prior art, the working solution used during the electric discharge machining can be fed and drained more smoothly and sufficiently than the prior art. Therefore, the sludge that is formed by the electric discharge machining and that prevents the subsequent electric discharge machining operation, can be more efficiently removed than the prior art. Accordingly, the discharge phenomenon takes place more vigorously between the electrode and the metal mold blank than in the prior art, and the machining rate can be enhanced.

Since the electrode for the electric discharge machining is smaller than that of the prior art, the term for its production can be greatly shortened compared to that of the prior art. Accordingly, machining for forming the slit grooves can be started at an early time compared to the prior art and, besides, the lead time for producing the metal mold for molding a honeycomb structure can be greatly shortened compared to that of the prior art.

The effect for shortening the lead time will be concretely described with reference to FIG. 21.

Figure 21:
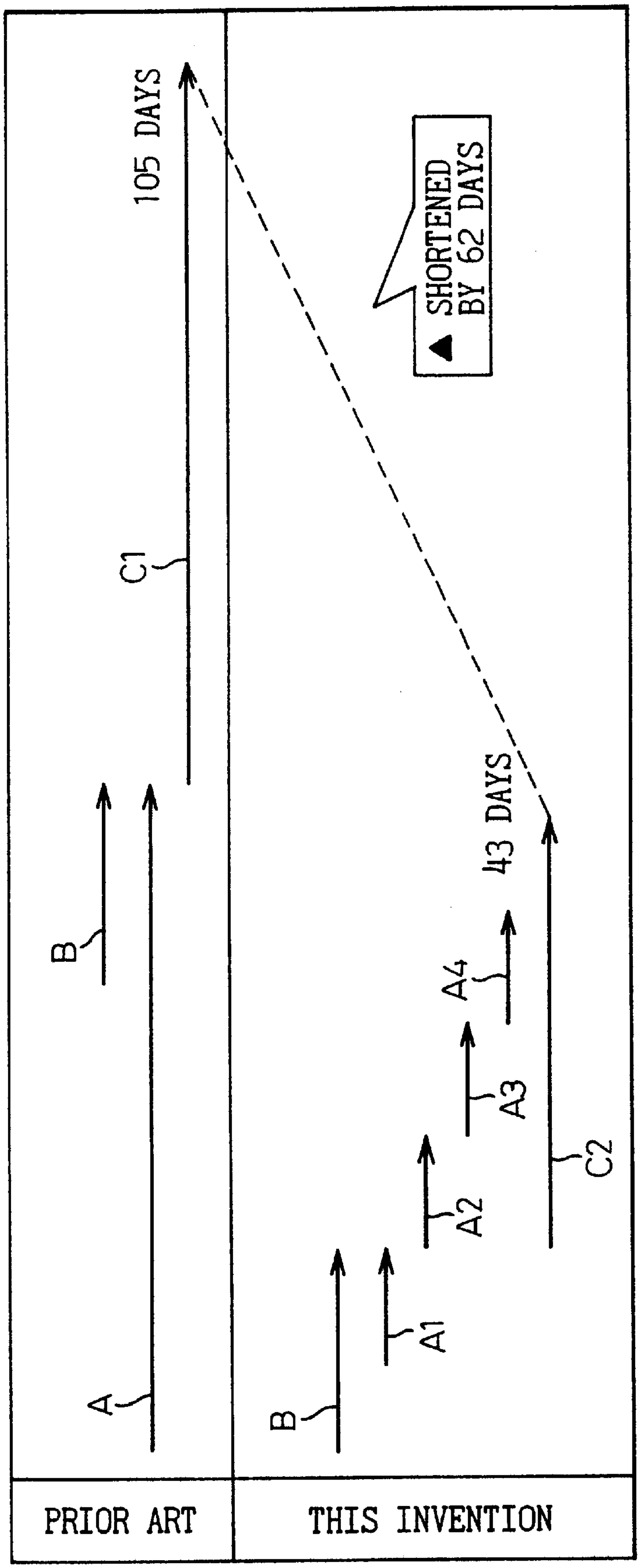
FIG. 21 is a view illustrating the effect for shortening the lead time according to the embodiment of the fourth invention.

In FIG. 21, the abscissa represents the elapsed days, and the steps are represented by arrows in time series. The upper stage represents the case where a conventional large (unitary) electrode for the electric discharge machining is to be produced, and the lower stage represents the case where a small electrode 81 for the electric discharge machining of the embodiment is to be produced.

In the case of the prior art, as will be seen from FIG. 21, the production A of the electrode for the electric discharge machining takes 50 days, the work (blank work) B for preparing the metal mold blank 4 and for forming the feed holes takes 15 days, and the work C1 for forming the slit grooves takes 55 days. Here, the blank work B can be conducted in parallel with the production A of the electrode for the electric discharge machining. Therefore, the lead time for producing the metal mold for molding a honeycomb structure is A+C1, i.e., 105 days.

In the case of this embodiment, on the other hand, it is presumed that four electrodes 81 are used for the electric discharge machining. Then, the productions A1 to A4 of the electrodes 81 for the electric discharge machining take 7 days, respectively, the work (blank work) B for preparing the metal mold blank 4 and for forming the feed holes takes 15 days, and the work C2 for forming the slit grooves takes 28 days. Here, the work for forming the slit grooves can be started at a moment when the production A1 of an electrode 81 for the electric discharge machining and the blank work B have completed. Therefore, the lead time for producing the metal mold for molding a honeycomb structure according to this embodiment is B+C2, i.e., 43 days.

In this embodiment, therefore, the lead time is shortened by about 60 days.

The period of the work C2 for forming the slit grooves is shortened compared to that of the prior art chiefly because the effect for removing the sludge is improved accompanying an improvement in the ability for feeding and discharging the working solution owing to a decrease in the size of the working surface as described above.

According to this embodiment as described above, there is provided a method of producing a metal mold for molding a honeycomb structure, which is capable of forming the slit grooves maintaining a high precision and in a short lead time.

Another embodiment is realized by changing the order of the plurality of the electric discharge machinings in the above-mentioned embodiment.

That is, in this embodiment, a unit work is executed in which the above-mentioned nine regions S1 to S9 are electrically discharge-machined:up to a depth of one-fourth the desired depth D (FIG. 13) of the slit grooves. The unit work is then repeated another three times to accomplish the desired depth D of the slit grooves 3.

The electrode 81 for the electric discharge machining is renewed after each unit work, and a total of four electrodes 81 are used.

In this embodiment, furthermore, the unit work is so conducted that the electric discharge machining is effected, first, for the central region S5 that is located at the center among the nine regions and, then, the machining is effected successively to separate away from the central region. Concretely speaking, in FIG. 19, the machining is effected in the order of S5, S4, S6, S3, S7, S2, S8, S9.

In the case of this embodiment, the above-mentioned regions S1 to S9 are not worked to the desired depth through one time of the electric discharge machining, but the above-mentioned unit work is repeated to increase the depth of the grooves. Owing to the stepwise electric discharge machining, dispersion in the locally machined portions is suppressed, and the slit grooves are machined maintaining an improved precision.

Upon conducting the unit work in the above-mentioned order, furthermore, changes in the width of the slit grooves caused by fine dispersion in the machining can be set to be symmetrical in the right-and-left direction. This improves the moldability a the time of molding a honeycomb structure by using the metal mold for molding.

In other respects, the actions and effects are the same as those of the above-mentioned embodiment.

Though the above-mentioned embodiments have dealt with the case where the slit grooves are of the shape of a hexagonal lattice, the same actions and effects are obtained even when the slit grooves are of a square shape, an octagonal shape or of any other shape.

While the invention has been described by reference to specific embodiments chosen for purposes of illustration, it should be apparent that numerous modifications could be made by those skilled in the art without departing from the basic concept and scope of the invention.

What is claimed is:

1. A method of producing a metal mold for molding a honeycomb structure, having a plurality of feed holes for feeding a material and slit grooves formed in the shape of a lattice being communicated with said feed holes to mold the material into a honeycomb shape, wherein said slit grooves are formed in the groove-forming surface of the metal mold blank by electric discharge machining that is executed a plural number of times by using a small electrode for electric discharge machining having a working surface of an area smaller than the area of said groove-forming surface, the working surface being configured to form a plurality of slit grooves.

2. A method of producing a metal mold for molding a honeycomb structure according to claim 1, wherein said working surface of said electrode for electric discharge machining is of a size capable of machining one region among n regions of said groove-forming surface that is divided into n regions in the direction of width, and the electric discharge machining is executed by repeating, a plural number of times, a unit work which machines said n regions to accomplish a predetermined depth by using said electrode for electric discharge machining.

3. A method of producing a metal mold for molding a honeycomb structure according to claim 2, wherein said unit work is carried out in a manner that the central region located nearly at the center is electrically discharge-machined, first, among the n regions and, then, the regions are successively machined to separate away from the central region.

4. A method of producing a metal mold for molding a honeycomb structure according to claim 1, wherein in said working surface of said electrode for electric discharge machining, every portion that contributes to the machining has the shape of a lattice corresponding to the lattice shape of said slit grooves, and has no incomplete side that does not form the lattice.

5. A method of producing a metal mold for molding a honeycomb structure according to claim 1, wherein among the plural times of electric discharge machinings, the second and subsequent electric discharge machinings are executed by so moving the electrode for electric discharge machining that at least one of the lattices of the working surface is overlapped on the lattice formed by the preceding electric discharge machining.

6. A method of producing a metal mold for molding a honeycomb structure according to claim 1, wherein said electrode for electric discharge machining is provided with a working solution-feeding jig for feeding a working solution for electric discharge machining, and said working solution-feeding jig has two or more working solution injection ports.

7. A method of producing a metal mold for molding a honeycomb structure according to claim 1, wherein the working surface of the small electrode is configured so that slit grooves in the shape of a lattice are formed on the groove-forming surface of the metal mold blank.

8. A method of producing a metal mold for molding a honeycomb structure according to claim 1, wherein the working surface of the small electrode is configured so that slit grooves in the shape of a hexagonal lattice are formed on the groove-forming surface of the metal mold blank.

* * * * *